United States Patent [19]

Takahashi et al.

[11] Patent Number: 4,944,719
[45] Date of Patent: Jul. 31, 1990

[54] PLANETARY GEAR TYPE SPEED CHANGE DEVICE HAVING ONE-WAY CLUTCH OPERABLE IN TWO FUNCTIONS

[75] Inventors: Tokuyuki Takahashi, Aichi; Hiroshi Ito; Seitoku Kubo, both of Toyota, all of Japan

[73] Assignee: Toyota Jidosha Kabushiki Kaisha, Aichi, Japan

[21] Appl. No.: 226,470

[22] Filed: Aug. 1, 1988

[30] Foreign Application Priority Data

Aug. 5, 1987 [JP] Japan .................. 62-195471
Aug. 5, 1987 [JP] Japan .................. 62-195472

[51] Int. Cl.$^5$ ............................................. F16H 57/10
[52] U.S. Cl. .................................. 475/281; 475/287
[58] Field of Search ............... 74/758, 759, 760, 762, 74/763, 764, 765

[56] References Cited

U.S. PATENT DOCUMENTS

| | | | |
|---|---|---|---|
| 3,473,415 | 10/1969 | Kepner | 74/759 |
| 3,483,771 | 12/1969 | Förster et al. | 74/763 X |
| 3,811,343 | 5/1974 | Mori et al. | 74/759 |
| 3,941,013 | 3/1976 | Miller | 74/740 |
| 3,986,413 | 10/1976 | Stockton | 74/762 X |
| 4,086,827 | 3/1978 | Chana | 74/759 |
| 4,430,908 | 2/1984 | Stockton | 74/760 X |
| 4,607,541 | 8/1986 | Miura et al. | 74/758 |
| 4,722,242 | 2/1988 | Miura et al. | 74/701 X |
| 4,747,323 | 5/1988 | Kiuchi et al. | 74/763 |

FOREIGN PATENT DOCUMENTS

| | | | |
|---|---|---|---|
| 57-101151 | 6/1982 | Japan | 74/763 |
| 61-290264 | 12/1986 | Japan | 74/759 |
| 61-290265 | 12/1986 | Japan | 74/759 |
| 2035479 | 6/1980 | United Kingdom | 74/763 |
| 2181798 | 4/1987 | United Kingdom | 74/763 |

Primary Examiner—Leslie A. Braun
Assistant Examiner—Chris Campbell
Attorney, Agent, or Firm—Oliff & Berridge

[57] ABSTRACT

A planetary gear type speed change device having a first planetary gear mechanism 10, 12, 14, 16 or 60, 64, 66, 68, 70 and a second planetary gear mechanism 20, 22, 24, 26 or 62, 64, 66, 70 incorporated between an input shaft 52 and an output shaft 54 by a selectively actuable drive system including four clutches 38, 40, 42, 44, two brakes 46, 48 and a one-way clutch 34, wherein the one-way clutch 34 has two functions of selectively braking the ring gear 12 or the carrier 70 with respect to the housing 50 via the brake 46 in providing a first speed stage and also of selectively connecting the carrier 26 or 70 with the sun gear 20 or 62 via the clutch 40 in providing a third speed stage.

5 Claims, 4 Drawing Sheets

PLANETARY GEAR TYPE SPEED CHANGE DEVICE HAVING ONE-WAY CLUTCH OPERABLE IN TWO FUNCTIONS

BACKGROUND OF THE INVENTION

1. Field of the Invention

The present invention relates to a planetary gear type speed change device for an automatic transmission for a vehicle such as an automobile.

2Description of the Prior Art

Various constructions have been proposed for a planetary gear type speed change device for an automatic transmission for a vehicle such as an automobile. These generally comprise one or more planetary gear mechanisms, and clutches and brakes for selectively interconnecting structural members such as sun gears, ring gears and carriers of the planetary gear mechanisms with one another or braking these with respect to the housing of the speed change device. Some of the clutches or the brakes are constructed as one-way clutches or one-way brakes to obtain automatic engagement or disengagement function of the clutches or the brakes during switching over of the speed stages provided by the speed change device.

Conventionally, the one-way clutches or the one-way brakes are generally used in such a manner that a certain clutch or brake selectively connects certain two relatively rotatable members with one another. In this manner of use the function of a one-way clutch or one-way brake is so limited.

SUMMARY OF THE INVENTION

The object of the present invention is to provide a planetary gear type speed change device of the above-mentioned kind in which a one-way clutch or one-way brake is used for selectively connecting more than one combination of two relatively rotatable members, so that the utility of the one-way clutch or one-way brake is correspondingly increased, thereby improving the compactness of the planetary gear type speed change device of the above-mentioned kind.

The above-mentioned object is achieved according to the present invention by a planetary gear type speed change device comprising:
  a housing;
  an input rotary member;
  an output rotary member;
  a first planetary gear mechanism having a first sun gear, a first ring gear, first planetary pinions and a first carrier;
  a second planetary gear mechanism having a second sun gear, a second ring gear, second planetary pinions and a second carrier; and
  an inteconnecting means including a one-way clutch and connecting said first and said second planetary gear mechanism between said input rotary member and said output rotary member in such a manner that in a first stage said first planetary gear mechanism drives said output rotary member relative to said input rotary member at a first rotational ratio less than unity under a reaction available by engagement of said one-way clutch; in a second stage said first planetary gear mechanism drives the output member at a second rotational ratio intermediate said first rotational ratio and unity when said second sun gear is braked with respect to said housing which brings about freewheeling of said one-way clutch; in a third stage, a rotational ratio of unity between input and output is achieved when said first and said second planetary gear mechanism are both locked up so as to rotate as a unitary body when said second planetary gear mechanism is locked up via engagement of said one-way clutch; in a fourth stage, said second planetary gear mechanism overdrives said output rotary member relative to said input rotary member when said second sun gear is braked with respect to said housing; and in a reverse stage, said second planetary gear mechanism drives said output rotary member counter to the rotation of said input rotary member at a rotational ratio greater than unity when said second carrier is braked with respect to said housing and said first planetary gear mechanism freewheels.

According to an embodiment of the present invention, said first planetary gear mechanism and said second planetary gear mechanism are each a simple planetary gear mechanism, and said interconnecting means connect said first ring gear with said second carrier and said first carrier with said second ring gear.

According to another embodiment of the present invention, said first and said second planetary gear mechanism are provided by a Ravingeau type planetary gear mechanism having two sun gears serving as said first and said second sun gear, a common ring gear serving as said first and said second ring gear, large planetary pinions and small planetary pinions, said large planetary pinions serving as said second planetary pinions and the combination of said large planetary pinions and said small planetary pinions serving as said first planetary pinions, and a common carrier supporting said large planetary pinions and said small planetary pinions.

According to a more detailed embodiment of the present invention, said one-way clutch is provided in series with a brake between said second carrier and said housing, and a clutch is provided in series with said one-way clutch to selectively connect said second carrier with said second sun gear, said one-way clutch being positioned between said second carrier and said brake, said one-way clutch being engaged to brake said second carrier against forward rotation with respect to said housing when said brake is engaged and also being engaged to brake said second carrier against forward rotation with respect to said second sun gear so as thereby to lock up said second planetary gear mechanism in forward rotation when said clutch is engaged.

In the above-mentioned more detailed embodiment, said brake is a one-way brake which is engaged when said second carrier attempts to rotate forward with respect to said housing and freewheel in a reversed rotational direction.

BRIEF DESCRIPTION OF THE DRAWINGS

In the accompannying drawings.

DESCRIPTION OF THE PREFERRED EMBODIMENTS

The present invention will now be described in detail with reference to the attached drawings, and in terms of embodiments.

FIRST EMBODIMENT

Figure 1:
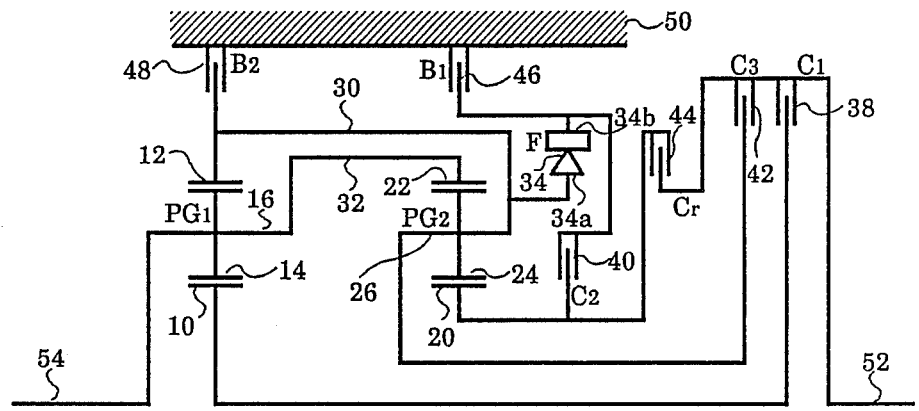
FIG. 1 is a schematic structural diagram showing a first embodiment of the planetary gear type speed change device according to the present invention.

Referring first to FIG. 1, the first embodiment of the planetary gear wheel type speed change device according to the present invention includes a first planetary gear mechanism PG1 and a second planetary gear mechanism PG2. The first planetary gear mechanism PG1 has a sun gear 10, a ring gear 12, planetary pinions 14 (only one is shown), and a carrier 16. The second planetary gear mechanism PG2 has a sun gear 20, a ring gear 22, planetary pinions 24 (only one is shown), and a carrier 26. The ring gear 12 of the first planetary gear mechanism PG1 is connected with the carrier 26 of the second planetary gear mechanism PG2 by a connecting member 30, and the carrier 16 of the first planetary gear mechanism PG1 is connected with the ring gear 22 of the second planetary gear mechanism PG2 by a connecting member 32.

A one-way clutch 34 (F) and a brake 46 (B1) are provided in series between the combination of the ring gear 12 and the carrier 26 by the connecting member 30 and the housing 50 of the speed change device, wherein the one-way clutch 34 is positioned between the brake 46 and the combination of the ring gear 12 and the carrier 26. The one-way clutch 34 has an inner race 34a connected with the combination of the ring gear 12 and the carrier 26 by the connecting member 30 and an outer race 34b connected with a rotational member of the brake 46. The one-way clutch 34 is engaged when the inner race 34a attempts to rotate faster than the outer race 34b in the normal rotational direction and freewheels in the reversed relative direction.

A clutch 38 (C1) is provided to selectively connect the sun gear 10 with an input shaft 52. A clutch 40 (C2) is provided to selectively connect the sun gear 20 with the rotational member of the brake 46 and also with the outer race 34b of the one-way clutch 34. A clutch 42 (C3) is provided to selectively connect the carrier 26 with the input shaft 52. A clutch 44 (Cr) is provided to selectively connect the sun gear 20 with the input shaft 52. A brake 48 (B2) is provided to selectively brake the combination of the ring gear 12 and the carrier 26 by the connecting member 30 with respect to the housing 50. An output shaft 54 is connected with the combination of the carrier 16 and the ring gear 22 by the connecting member 32.

The speed change device shown in FIG. 1 achieves a first speed stage, a second speed stage, a third speed stage (direct drive stage), a fourth speed stage (overdrive stage) and a reverse stage according to engagement and disengagement of the above-mentioned clutches and brakes, as summarized in Table 1. In this above table, a circle indicates that the relevant clutch, brake or one-way clutch is engaged in the engine drive state, and a circle in parenthesis indicates that if the clutch or brake is engaged the engine braking will be obtained in that speed stage.

TABLE 1

|  | C1 38 | C2 40 | C3 42 | Cr 44 | B1 46 | B2 48 | F 34 |
|---|---|---|---|---|---|---|---|
| First speed stage | o |  |  |  | o | (o) | o |
| Second speed stage | o | o |  |  | o |  |  |
| Third speed stage | (o) | o | o |  |  |  | o |
| Fourth speed stage |  | o | o |  | o |  |  |
| Reverse stage |  |  |  | o |  | o |  |

When the ratio of the number of teeth of the sun gear 10 to the number of teeth of the ring gear 12 in the first planetary gear mechanism PG1 is $r_1$, and the ratio of the number of teeth of the sun gear 20 to the number of teeth of the ring gear 22 in the second planetary gear mechanism PG2 is $r_2$, then the speed change ratios in the above five stages are as shown in Table 2.

TABLE 2

|  | Speed Change Ratio |
|---|---|
| First speed stage | $(1 + r_1)/r_1$ |
| Second speed stage | $(1 + r_1)/r_1 - 1/\{r_1(1 + r_2)\}$ |
| Third speed stage | 1 |
| Fourth speed stage | $1/(1 + r_2)$ |
| Reverse stage | $-1/r_2$ |

The operation of the speed change device shown in FIG. 1 will be described about the above five stages.

FIRST SPEED STAGE

The speed change device is shifted from neutral to the first speed stage by engaging the clutch C1 and the brake B1. When the clutch C1 is engaged, the sun gear 10 is connected with the input shaft 52 and is driven thereby. Therefore the planetary pinions 14 will rotate about their own axes and the ring gear 12 attempts to rotate in a reversed direction. However, since at this time the one-way clutch F is engaged with its outer race 34b being held stationary by the engagement of the brake B1, the ring gear 12 is braked with respect to the housing 50 and acts as a reacting member, and therefore the planetary pinions 14 revolve about the sun gear 10 together with the carrier 16 while rotating around their own axes, and thereby the rotary power is transmitted to the output shaft 54 according to the speed reducing function of the first planetary gear mecahnism PG1 in the above described gear ratio.

SECOND SPEED STAGE

The speed change device is shited from the first speed stage to the second speed stage by simply further engaging the clutch C2 while leaving the clutch C1 and the brake B1 in the engaged state. When the clutch C2 is engaged, the sun gear 20 is connected with the brake B1 and is thereby braked with respect to the housing 50 so as to act as a reacting member, and at the same time the one-way clutch F begins to slip. Now, with the sun gear 20 being fixed the planetary pinions 24 rotate around their own axes while revolving forward about the sun gear 20 together with the carrier 26, thus reducing the effect of the first planetary gear mechanism PG1 for delaying the output rotary shaft 54 backward relative to the input rotary shaft 52, thereby reducing the speed reduction gear ratio as shown in Table 2.

THIRD SPEED STAGE

The speed change device is shifted from the second speed stage to the third speed stage by further engaging the clutch C3 and releasing the brake B1 while the clutch C2 and the clutch C1 remain engaged. When the clutches C2 and C3 are both engaged, the second planetary gear mechanism PG2 is locked up in the forward drive direction via the one-way clutch F and the first planetary gear mechanism PG1 is also locked up. Therefore, the speed change device is in the direct drive state. The speed change ratio is of course unit. It would be noted that once this direct drive stage in achieved the clutch C1 may be released but may be engaged to obtain engine braking.

FOURTH SPEED STAGE

The speed change device is shifted from the third speed stage to the fourth speed stage, i.e. overdrive stage, by first, if the clutch C1 is engaged, releasing the clutch C1, and after the release of the clutch C1, engaging the brake B1 while the clutch C2 and the clutch C3 remain in the engaged state. When the brake B1 is engaged with the clutch C2, the sun gear 20 is braked with respect to the housing 50, and therefore when the rotary power from the input shaft 52 drives the carrier 26 about the sun gear 20, the one-way clutch F slips and the ring gear 22 rotates at an increased speed around the sun gear 20. Therefore, the rotary power is transmitted under the overdriving function by the second planetary gear mechanism PG2 while the first planetary gear mecahnism PG1 freewheels.

REVERSE STAGE

The speed change device is shifted from the neutral state to the reverse stage by engaging both the clutch Cr and the brake B2. At this time the rotary power is input to the sun gear 20. Since the carrier 26 is braked with respect to the housing 50, the rotary power is transmitted through the planetary pinions 24 to the ring gear 22 to drive it in the reversed direction at a speed change ratio determined by the gear ratio of the second planetary gear mechanism PG2, and in this way the reverse stage is achieved.

It should be noted that the speed changes from the fourth speed stage to the third speed stage, from the third speed stage to the second speed stage, and from the second speed stage to the first speed stage may be carried out by actions reverse to the above described speed change actions. For example, the speed change from the fourth speed stage to the third speed stage may be carried out by releasing the brake B1.

SECOND EMBODIMENT

Figure 2:
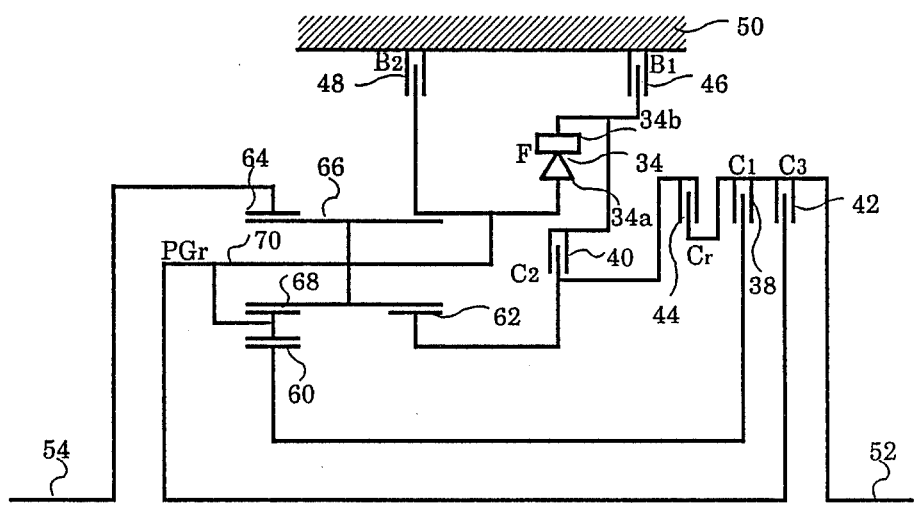
FIG. 2 is a schematic structural diagram showing a second embodiment of the planetary gear type speed change device according to the present invention.

FIG. 2 shows a second embodiment of the planetary gear type speed change device according to the present invention. In FIG. 2 the portions corresponding to those shown in FIG. 1 are designated by the same reference numerals as in FIG. 1. The planetary gear mechanism PGr in the embodiment shown in FIG. 2 is of the so-called Ravingeau type and has a first sun gear 60, a second gear 62, a ring gear 64, large planetary pinions 66 (only one is shown) meshing with the second sun gear 62 and the ring gear 64, small planetary pinions 68 (only one is shown) meshing with the first sun gear 60 and the large planetary pinions 66, and a carrier 70 which supports rotatably the large planetary pinions 66 and the small planetary pinions 68. In the speed change device shown in FIG. 2 the combination of the sun gear 60, the small planetary pinions 68, the large planetary pinions 66 and the ring gear 64 serves as a first planetary gear mechanism corresponding to the first planetary gear mechanism PG1 in the speed change device shown in FIG. 1, and the combination of the sun gear 62, the large planetary pinions 66 and the ring gear 64 serves a second planetary gear mechanism corresponding to the second planetary gear mechanism PG2 in the speed change device shown in FIG. 1.

A one-way clutch 34 (F) and a brake 46 (B1) are provided in series between the carrier 70 and the housing 50 in the same way as in the first embodiment. The one-way clutch 34 has an inner race 34a connected with the carrier 70 and an outer race 34b connected with a rotational member of the brake 46 and is positioned between the carrier 70 and the brake 46. The one-way clutch 34 is engaged when the inner race 34a attempts to rotate faster than the outer race 34b in the normal rotational direction and freewheels in the reversed relative direction.

A clutch 38 (C1) is provided to selectively connect the sun gear 60 with the input shaft 52. A clutch 40 (C2) is provided between the sun gear 62 ad the combination of the rotational member of the brake 46 and the outer race 34b of the one-way clutch 34. The clutch 40 selectively connects the sun gear 62 with the brake 46. A clutch 42 (C3) is provided to selectively connect the carrier 70 with the input shaft 52. A clutch 44 (Cr) is provided to selectively connect the sun gear 62 with the input shaft 52. A brake 48 (B2) is provided to selectively brake the rotation of the carrier 70 with respect to the housing 50. The output shat 54 is connected with the ring gear 64.

The speed change device shown in FIG. 2 is shifted to a first speed stage, a second speed stage, a third speed stage (direct drive stage), a fourth speed stage (overdrive stage) and a reverse stage in a manner similar to that in the first embodiment according to the same combinations of engagement and disengagement of the clutches, the brakes and the one-way clutch as shown in Table 1.

In the speed change device of this second embodiment, when the ratio of the number of teeth of the first sun gear 60 to the number of teeth of the ring gear 64 is $r_1$, and the ratio of the number of teeth of the second sun gear 62 to the number of teeth of the ring gear 64 is $r_2$, then the speed change ratios for the various stages are as shown in Table 3.

TABLE 3

|  | Speed Change Ratio |
| --- | --- |
| First speed stage | $1/r_1$ |
| Second speed stage | $(1/r_1) - (1 - r_1)/\{r_1(1 + r_2)\}$ |
| Third speed stage | 1 |
| Fourth speed stage | $1/(1 + r_2)$ |
| Reverse stage | $-1/r_2$ |

The operation of the speed change device shown in FIG. 2 will now be described about the above five stages.

FIRST SPEED STAGE

The speed change device is shifted from neutral to the first speed stage by engaging the clutch C1 and the brake B1. When the clutch C1 is engaged, the sun gear 60 is connected with the input shaft 52 and is driven thereby. The small planetary pinions 68 and the large planetary pinions 66 would each rotate around their own axes while revolving about the sun gear 60. However, since the brake B1 is engaged, the carrier 70 is braked with respect to the housing 50 via the one-way clutch F and acts as a reacting member, so that the rotary power is transmitted by the rotation of the small planetary pinions 68 around their own axes and the rotation of the large planetary pinions 66 around their own axes to the ring gear 64 in the above described speed change ratio.

SECOND SPEED STAGE

The speed change device is shifted from the first speed stage to the second speed stage by engaging the clutch C2 while leaving the clutch C1 and the brake B1 in the engaged state. When the clutch C2 is engaged, the sun gear 62 is braked with respect to the housing 50 by the brake B1 and acts as a reacting member, while the one-way clutch F begins to slip. At this stage, with the sun gear 62 in the braked state, the large planetary pinions 66 revolve about the sun gear 62 together with the carrier 70 while rotating around their own axes, and therefore, reduce the effect of decreasing the rotational speed of the output shaft 54 relative to the input shaft 52 by the combination of the sun gear 60, the small planetary pinions 68, the large planetary pinions 66 and the ring gear 64. Therefore, the rotary power is transmitted at the speed reduction ratio as shown in Table 3.

THIRD SPEED STAGE

The speed change device is shifted from the second speed stage to the third speed stage, i.e. direct drive stage, by engaging the clutch C3 and releasing the brake B1, while leaving the clutches C1 and C2 in the engaged state. When the clutches C2 and C3 are both engaged, the planetary pinions PGr goes into the locked condition in the forward driving direction via engagement of the one-way clutch F, whereby a direct drive of a speed change ratio of 1 is achieved. Once this direct drive stage has been achieved, the clutch C1 may be released but may be engaged to obtain engine braking.

FOURTH SPEED STAGE

The speed change device is shifted from the third speed stage to the fourth speed stage, i.e. overdrive stage, by first, if the clutch C1 is engaged, releasing the clutch C1, and then after the release of the clutch C1, engaging the brake B1 with the clutch C2 and the clutch C3 remaining in the engaged state. When the brake B1 is engaged with the clutch C2 being engaged, the sun gear 62 is braked with respect to the housing 50, and therefore the rotary power input to the carrier 70 drives the large planetary pinions 66 to rotate around their own axes and to revolve about the sun gear 62 while the one-way clutch 34 slips. In this way the ring gear 64 is driven at an increased speed, and thus the rotary power is transmitted to the output shaft 54 in an overdrive manner.

REVERSE STAGE

The reverse stage is achieved from the neutral state by engaging the clutch Cr together with the brake B2. At this time the rotary power is input to the sun gear 62 while the carrier 70 is braked with respect to the housing 50. Therefore, the rotary power is transmitted from the sun gear 62 to the ring gear 64 in the reversed direction through the rotation of the large planetary pinions 66 around their own axes at a speed change ratio determined by the gear wheel tooth ratio between the ring gear 64 and the sun gear 62, and the reverse stage is thus achieved.

Also in the speed change device shown in this second embodiment, the speed changes from the fourth speed stage to the third speed stage, from the third speed stage to the second speed stage, and from the second speed stage to the first speed stage can each be carried out by reversing the operations of the above described speed changes.

FIRST MODIFICATION OF THE FIRST EMBODIMENT

Figure 3:
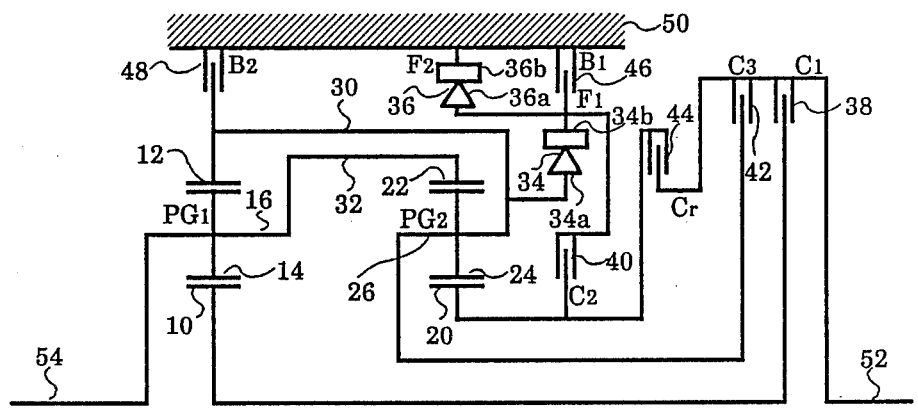
FIGS. 3 and 4 are schematic structural diagrams showing a first and a second modification of said first embodiment of the planetary gear type speed change device according to the present invention.

FIG. 3 shows a first modification of the first embodiment of the present invention shown in FIG. 1. The structure of this first modification is different from that of the first embodiment in that a one-way brake 36 (F2) having an inner race 36a and an outer race 36b is additionally provided in parallel with the brake 46 (B1). The one-way clutch 34 is now denoted as a one-way clutch F1.

The speed change device according to this modification achieves a first speed stage, a second speed stage, a third speed stage (direct drive stage), a fourth speed stage (overdrive stage) and a reverse stage according to engagement and disengagement of the clutches, the brakes, the one-way clutch and the one-way brake, as summarized in Table 4. In this table, a circle indicates that the relevant clutch, brake, one-way clutch or one-way brake is enngaged in the engine drive state, and a circle in parenthesis indicates that if the clutch or brake is engaged the engine braking will be obtained in that speed stage.

TABLE 4

|  | C1 38 | C2 40 | C3 42 | Cr 44 | B1 46 | B2 48 | F1 34 | F2 36 |
|---|---|---|---|---|---|---|---|---|
| First speed stage | o |  |  |  |  | (o) | o | o |
| Second speed stage | o | o |  |  | (o) |  |  | o |
| Third speed stage | (o) | o | o |  |  |  | o |  |
| Fourth speed stage |  | o | o |  | o |  |  |  |
| Reverse stage |  |  |  | o |  | o |  |  |

The speed change ratios at the respective stages in this modification are the same as those in the first embodiment.

The operation at each stage of this first modification of the first embodiment of the present invention will be described. However, since the operations of the first and second planetary gear mechanisms PG1 and PG2, the clutches C1, C2, C3 and Cr, the brakes B1 and B2 and the one way clutch F1 at the respective stages are the same as those in the first embodiment, in order to avoid any redundancy of the description, the operation will be generally described in a manner of comparison with that of the first embodiment and will be particularly directed to that of the one-way brake F2.

FIRST SPEED STAGE

The speed change device is shifted from neutral to the first speed stage by only engaging the clutch C1. The one-way brake F2 is automatically engaged to brake the ring gear 12 relative to the housing 50 through the one-way clutch F1. The brake B2 may also be engaged to obtain engine braking, when desired. The other operations are the same as those in the first speed stage in the first embodiment.

SECOND SPEED STAGE

The speed change device is shifted from the first speed stage to the second speed stage by simply further engaging the clutch C2. The brake B1 may be engaged when engine braking is desired.

THIRD SPEED STAGE

The speed change device is shifted from the second speed stage to the third speed stage by further engaging the clutch C3 while the clutch C2 and the clutch C1 remain engaged. The clutch C1 may be released but may be engaged to obtain engine braking.

FOURTH SPEED STAGE

The speed change device is shifted from the third speed stage to the fourth speed stage by, first, if the clutch C1 is engaged for engine braking, releasing the clutch C1, and after the release of the clutch C1, engaging the brake B1, while the clutch C2 and the clutch C3 remain in the engaged state.

REVERSE STAGE

The speed change device is shifted from the neutral state to the reverse stage by engaging both the clutch Cr and the brake B2.

The speed change from the fourth speed stage to the third speed stage, from the third speed stage to the second speed stage, and from the second speed stage to the first speed stage can each be carried out by reversing the operations of the above described speed changes.

Thus, it will be noted that in any shifting between two adjacent stages in the first through fourth speed stages, the speed stage shifting is achieved only by engaging or diaengaging one of the clutches and brakes with no simultaneous disengagement or engagement of other of the clutches and brakes.

SECOND MODIFICATION OF THE FIRST EMBODIMENT

Figure 4:
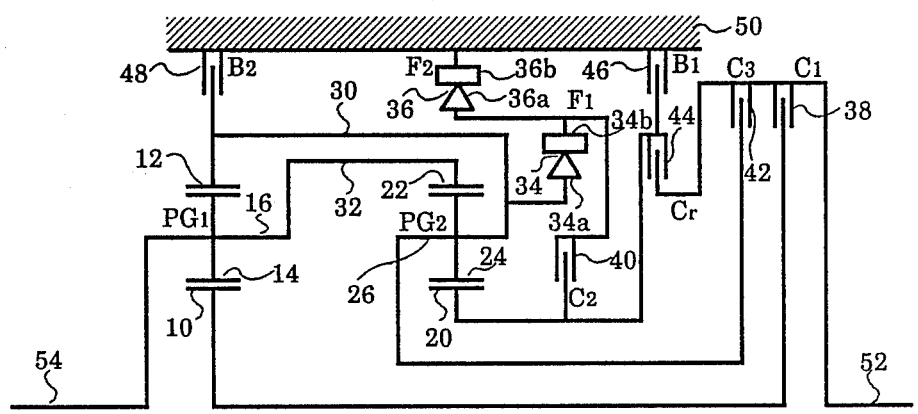

FIG. 4 shows a second modification of the first embodiment of the present invention shown in FIG. 1. This modification is different from the first embodiment in that the brake B1 is replaced by a one-way brake 36 (F2) having an inner race 36a and an outer race 36b, and the brake 46 (B1) s moved to the position acting between the housing 50 and the combination of the sun gear 20, an inner rotary member of the clutch C2 and an outer rotary member of the clutch Cr. This modification is also operated according to Table 4.

As noted in Table 4, when the brake B1 is engaged, the clutch C2 is always engaged. Therefore, it makes no difference as a gear train to dispose the brake B1 between the inner rotary member of the clutch C2 and the housing 50 as shown in FIG. 4 instead of disposing the brake B1 between the outer rotary member of the clutch C2 and the housing 50 as shown in FIG. 3. Selection between these two modifications may be made according to the spatial convenience in the actual design of the speed change device.

FIRST MODIFICATION OF THE SECOND EMBODIMENT

Figure 5:
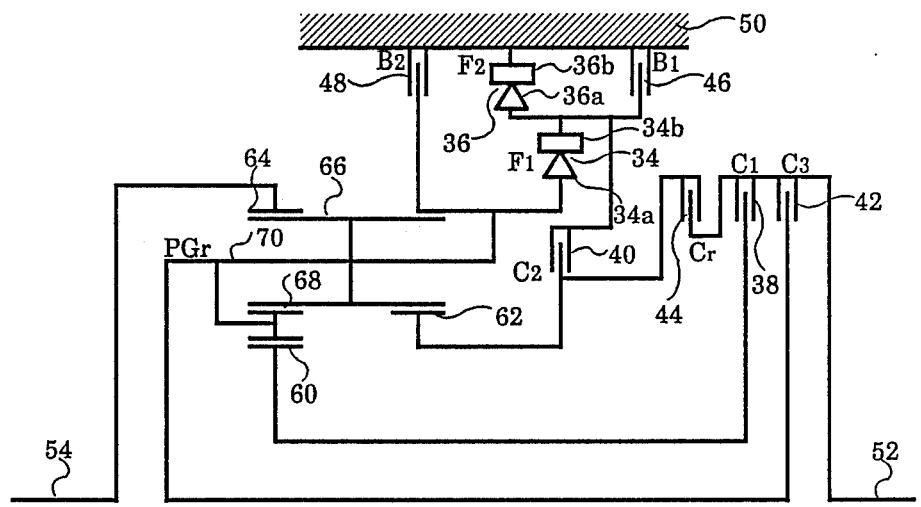
FIGS. 5 and 6 are schematic structural diagrams showing a first and a second modification of said second embodiment of the planetary gear type speed change device according to the present invention.

FIG. 5 shows a first modification of the second embodiment of the present invention shown in FIG. 2. The manner of this modification with respect to the second embodiment is the same as that of the first modification shown in FIG. 3 with respect to the first embodiment shown in FIG. 1. That is, a one-way brake 36 (F2) having an inner race 36i a and an outer race 36b is added in parallel with the brake 46 (B1). Therefore, the modification in the operation available by this modification in the structure will be obvious to those skilled in the art. Therefore, any further detailed description with respect to this modification will be omitted to avoid any redundancy of the description.

SECOND MODIFICATION OF THE SECOND EMBODIMENT

Figure 6:
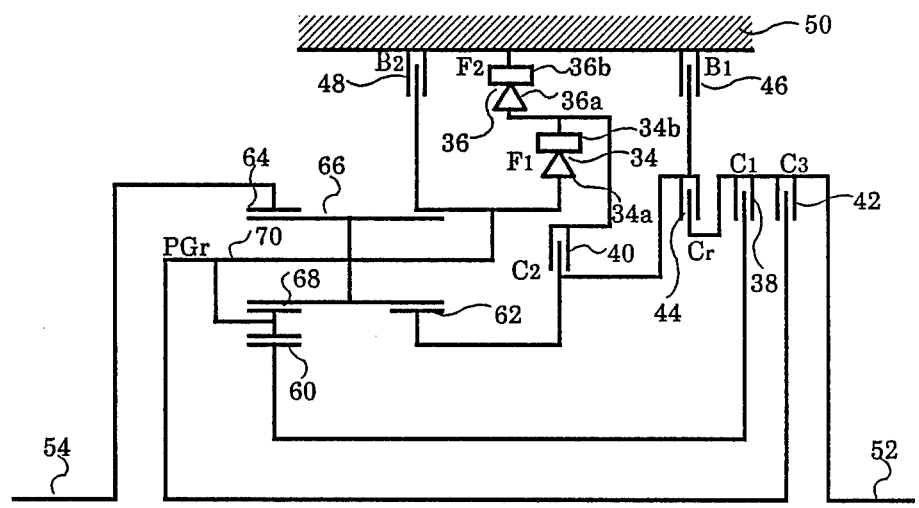

FIG. 6 shows a second modification of the second embodiment of the present invention shown in FIG. 2. The manner of this modification with respect to the second embodiment is the same as that of the second modification shown in FIG. 4 with respect to the first embodiment shown in FIG. 1. That is, the brake 46 (B1) is replaced by a one-way brake 36 (F2) having an inner race 36a and an outer race 36b and the brake 46 (B1) is moved to the position acting between the housing 50 and the combination of the sun gear 62, the inner rotary member of the clutch C2 and the outer rotary member of the clutch Cr. Therefore, the modification in the operation available by this modification in the structure will be obvious to those skilled in the art. Therefore, again any further detailed description will be omitted to avoid any redundancy of the description.

Figure 7:
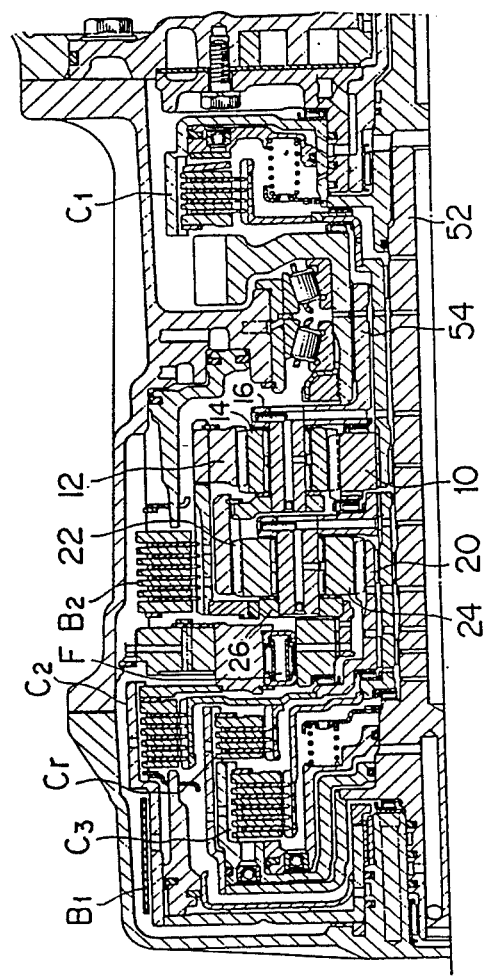
FIG. 7 is a longitudinally sectional view of a more concrete structure of a speed change device having the same basic structure as the first embodiment shown in FIG. 1.

FIG. 7 shows a more concrete structure in a longitudinally sectional view of a speed change device having the same basic structure as the first embodiment shown in FIG. 1. In FIG. 7 the principal constructional elements corresponding to those shown in FIG. 1 are designated by the same reference notations as in FIG. 1. Although the apparent relative positions of those constructional elements to one another in FIG. 7 may appear to be somewhat different from those in FIG. 1, it will be appreciated that they are in fact the same as those in FIG. 1.

The present invention has been described in detail with reference to particular embodiments thereof, but the present invention is not restricted to these, and it will be clear to those skilled in the relevant art that various other modifications are possible within the scope of the present invention.

We claim:

1. A planetary gear type speed change device comprising:
    a housing;
    an input rotary member;
    an output rotary member;
    a first planetary gear mechanism having a first sun gear, a first ring gear, first planetary pinions and a first carrier;
    a second planetary gear mechanism having a second sun gear, a second ring gear a second planetary pinions and a second carrier; and
    interconnecting means including a plurality of clutches. at least one brake and at least one-way clutch and connecting said first and said second planetary gear mechanism between said input rotary member and said output rotary member so as to provide a plurality of forward speed stages according to selective engagement and disengagement of said clutches and said brake, wherein said one-way clutch has a first and second clutch member, said first clutch member engaging said second clutch member when said first clutch member attempts to rotate in a first rotational direction relative to said second clutch member and freewheeling in a second rotational direction opposite to said first rotational direction relative to said second clutch member, and while driving in a first forward speed stage said first clutch member is impelled in said first rotational direction with said second clutch member reacting in said second rotational direction and while driving in a second forward speed stage said second clutch member is impelled in said second rotational direction with said first clutch member reacting in said first rotational direction.

2. A planetary gear type speed change device according to claim 1, wherein said first planetary gear mechanism and said second planetary gear mechanism are each a simple planetary gear mechanism, and said interconnecting means includes a first interconnecting member which connects said first ring gear with said second carrier and a second interconnecting member which connects said first carrier with said second ring gear.

3. A planetary gear type speed change device according to claim 1, wherein said first and said second planetary gear mechanism are provided by a Ravingeau type planetary gear mechanism having two sun gears serving as said first and said second sun gear, a common ring gear serving as said first and said second ring gear, large planetary pinions and small planetary pinions, said large planetary pinions serving as said second planetary pinions and a combination of said large planetary pinions and said small planetary pinions serving as said first planetary pinions, and a common carrier supporting said large planetary pinions and said small planetary pinions.

4. A planetary gear type of speed change device according to claim 1, wherein said one-way clutch connects only one of three relatively coaxially rotatable members of one of said planetary gear mechanism with a member external thereto in a first operational mode thereof, and connects two of the three relatively coaxially rotatable members of said one planetary gear mechanism with one another in a second operational mode thereof.

5. A planetary gear type speed change device according to claim 4, wherein said one-way clutch is provided in series with said brake between said second carrier and said housing, and one of said clutches is provided in series with said one-way clutch to selectively connect said second carrier with sais second sun gear said one-way clutch being positioned between said second carrier and said brake, said one-way clutch being engaged to brake said second carrier against forward rotation in said first direction with respect to said housing in said first rotational speed stage when said brake is engaged and also being engaged to brake said second sun gear against rotation in said second rotational direction with respect to said second carrier so as thereby to lock up said second planetary gear mechanism in said second speed stage when said one clutch is engaged,

* * * * *